US 8,977,971 B2

(12) United States Patent
Singh et al.

(10) Patent No.: US 8,977,971 B2
(45) Date of Patent: Mar. 10, 2015

(54) METADATA GENERATION SYSTEMS AND METHODS

(75) Inventors: Gurpreet Singh, New Delhi (IN); Nagesh Phaniraj, Bangalore (IN)

(73) Assignee: General Electric Company, Schenectady, NY (US)

( * ) Notice: Subject to any disclaimer, the term of this patent is extended or adjusted under 35 U.S.C. 154(b) by 548 days.

(21) Appl. No.: 13/043,007

(22) Filed: Mar. 8, 2011

(65) Prior Publication Data

US 2012/0166978 A1 Jun. 28, 2012

(30) Foreign Application Priority Data

Dec. 24, 2010 (IN) .......................... 3948/CHE/2010

(51) Int. Cl.
*G06F 3/00* (2006.01)
*G06F 9/44* (2006.01)
*G06F 9/45* (2006.01)

(52) U.S. Cl.
CPC ............... *G06F 8/38* (2013.01); *G06F 9/4443* (2013.01); *G06F 8/51* (2013.01)
USPC .......................... 715/762; 715/763; 715/764

(58) Field of Classification Search
CPC ................................ G06F 9/4443; G06F 8/38
USPC .......................... 715/221–226, 780, 762–764
See application file for complete search history.

(56) References Cited

U.S. PATENT DOCUMENTS

| 7,487,438 | B1 * | 2/2009 | Withers ........................ 715/223 |
| 7,624,027 | B1 * | 11/2009 | Stern et al. ...................... 705/2 |
| 8,140,590 | B2 * | 3/2012 | Genovese et al. ............. 707/804 |
| 2002/0165877 | A1 * | 11/2002 | Malcolm et al. .............. 707/507 |
| 2004/0001631 | A1 * | 1/2004 | Camara et al. ................ 382/224 |
| 2006/0004836 | A1 * | 1/2006 | Dhingra ....................... 707/102 |
| 2006/0077461 | A1 * | 4/2006 | Camara et al. .............. 358/1.15 |
| 2006/0095830 | A1 * | 5/2006 | Krishna et al. ................ 715/500 |
| 2006/0143154 | A1 * | 6/2006 | Jager ............................... 707/1 |
| 2006/0198559 | A1 * | 9/2006 | Manico et al. ................ 382/305 |
| 2007/0112764 | A1 * | 5/2007 | Yih et al. ......................... 707/5 |
| 2008/0247004 | A1 * | 10/2008 | Yeung ........................... 358/486 |
| 2009/0024637 | A1 * | 1/2009 | Krishna et al. ................. 707/10 |
| 2009/0119324 | A1 * | 5/2009 | Simard et al. ................ 707/102 |
| 2009/0125797 | A1 * | 5/2009 | Minagawa et al. ........... 715/221 |
| 2010/0128922 | A1 * | 5/2010 | Navon et al. ................. 382/100 |
| 2010/0161460 | A1 * | 6/2010 | Vroom et al. .................. 705/31 |

(Continued)

FOREIGN PATENT DOCUMENTS

WO 2008003095 A3 1/2008

*Primary Examiner* — Tadeese Hailu
(74) *Attorney, Agent, or Firm* — Hanley, Flight & Zimmerman, LLC

(57) ABSTRACT

Metadata generation systems and methods are described. An example computer-implemented method of automatically generating metadata used to develop graphical user interfaces includes scanning an image of a user interface to detect a candidate region on the image, the candidate region being potentially associated with a user interface component. The example method includes analyzing the candidate region to identify a user interface component contained therein by comparing a potential user interface component to user interface definitions stored in a database to identify one of the user interface definitions associated therewith. The example method includes extracting one or more properties of the identified user interface component and generating metadata based on the user interface definition associated with the identified user interface component and the extracted properties.

20 Claims, 6 Drawing Sheets

(56) References Cited

U.S. PATENT DOCUMENTS

2010/0241978 A1* 9/2010 Genovese et al. ............. 715/765
2011/0196864 A1* 8/2011 Mason et al. ................. 707/728
2011/0200256 A1* 8/2011 Saubat et al. ................. 382/195
2011/0286023 A1* 11/2011 Hagisawa et al. ............ 358/1.13
2011/0304861 A1* 12/2011 Monga et al. .................. 358/1.9

* cited by examiner

METADATA GENERATION SYSTEMS AND METHODS

RELATED APPLICATION

This patent claims priority to Indian Patent Application No. 3948/CHE/2010, filed Dec. 24, 2010, which is hereby incorporated by reference herein in its entirety.

BACKGROUND

Metadata used to develop user interfaces is typically generated by graphic designers and/or programmers. A process of developing a user interface can include the extremely time consuming process of selecting different user interface (UI) controls and dragging and dropping them on different portions of the UI screen to generate the corresponding metadata relating to these controls. An amount of time to develop a user interface is increased when the user interface is complex and/or includes numerous UI controls.

SUMMARY

An example computer-implemented method of automatically generating metadata used to develop graphical user interfaces includes scanning an image of a user interface to detect a candidate region on the image, the candidate region being potentially associated with a user interface component. The example method includes analyzing the candidate region to identify a user interface component contained therein by comparing a potential user interface component to user interface definitions stored in a database to identify one of the user interface definitions associated therewith. The example method includes extracting one or more properties of the identified user interface component and generating metadata based on the user interface definition associated with the identified user interface component and the extracted properties.

An example computer-implemented method of automatically generating metadata used to develop graphical user interfaces includes scanning an image of a user interface to detect a candidate region on the image, the candidate region being potentially associated with a user interface control. The example method includes performing an image recognition on the candidate region to identify a user interface control and generating metadata based on the identified user interface control.

An example tangible computer-readable storage medium including executable instructions for execution using a processor, wherein the instructions, when executed, provide a system to generate metadata, the system including a detector to detect a candidate region on an image of a user interface, the candidate region being potentially associated with a user interface control. The system including an analyzer to analyze the candidate region to identify a user interface control contained therein and a generator to generate metadata based on the identified user interface control.

Figure 1:
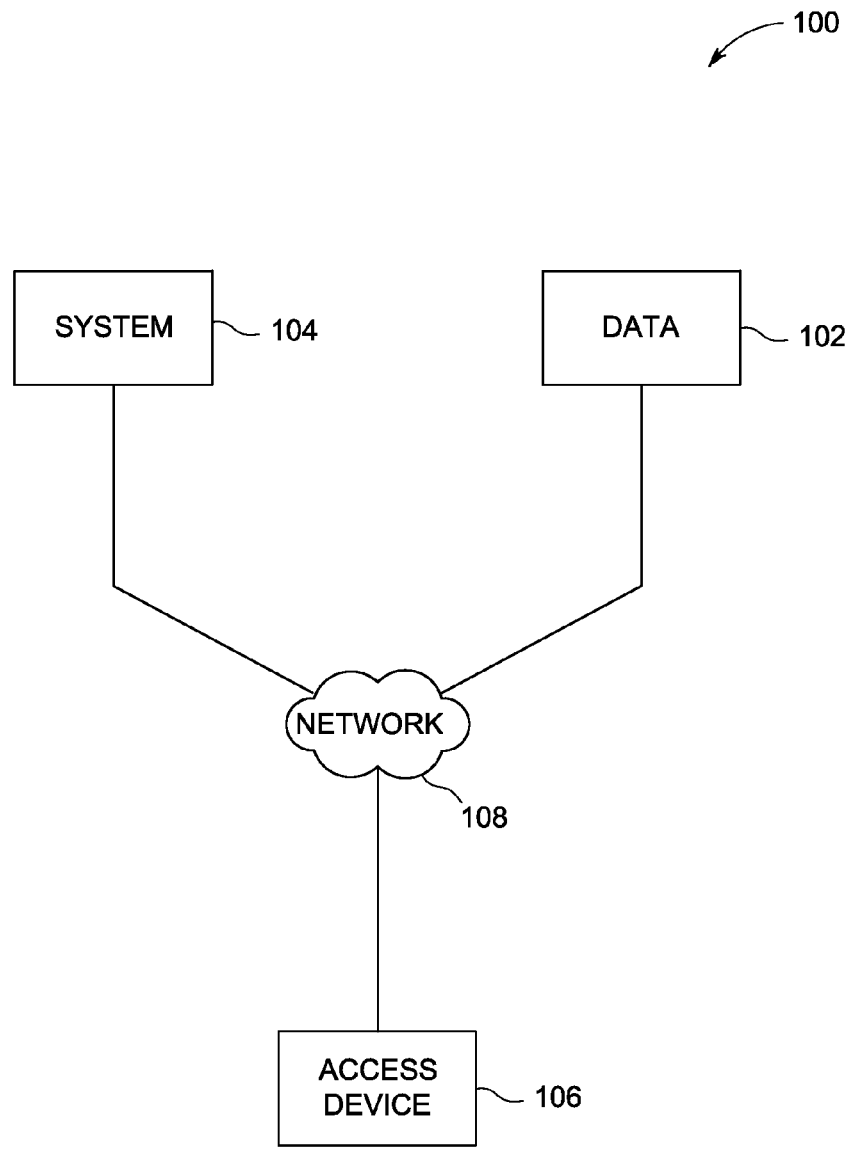
FIG. 1 is a block diagram of an example metadata generation system.

The foregoing summary, as well as the following detailed description of certain examples, will be better understood when read in conjunction with the appended drawings. For the purpose of illustrating the examples described herein, certain examples are shown in the drawings. It should be understood, however, that the present disclosure is not limited to the arrangements and instrumentality shown in the attached drawings.

DETAILED DESCRIPTION

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc. storing the software and/or firmware.

The example systems and methods described herein enable the automatic and efficient generation of user interface (UI) metadata from digital images. More specifically, instead of a graphic designer dragging and dropping UI controls on a designer surface when developing a user interface, the examples described search and identify UI controls and/or components contained in a digital image(s) and generate metadata for the same. The generated metadata may be stored in an XML file and may be technology neutral and/or platform-independent metadata that can be interpreted by a variety of technologies/software, etc. Thus, the generated metadata may be used to generate user interface screens using any technology such as .NET©, JAVA©, etc. The XML file may include data related to the identified UI control(s) such as type, location (e.g., X and Y coordinates), font, background color and/or size. The examples described may be easily integrated into integrated development environments or may be a separate product.

From digital images of user interfaces, the examples described process and recognize UI control component images within such digital images and, thereafter, generate technology neutral metadata. In some example, an example metadata conversion engine may receive a digital image as an input. The digital image may include a screenshot (e.g., a soft copy) containing UI controls. Additionally or alternatively, the digital image may be a hard copy of a screen shot containing UI controls drawn by a graphic designer that has been scanned and then converted into a digital image. The digital image may be a gif image, a tiff image or a jpeg image, for example.

Once the digital image is received, an example UI detection component of the metadata conversion engine may scan for and/or detect candidate regions of the image. The candidate regions may contain one or more UI controls. For example, the UI detection component may detect the top left corner of the digital image as being a candidate region because this region includes a rectangle and/or a 3-dimensional (3-D) image. In some examples, the UI detection component may include logic and/or internal metadata relating to what to check for when determining whether or not the image and/or a region therein possibly contains a UI control. For example, the UI detection component may identify regions within the image as being a candidate region by detecting the presence of certain shapes (e.g., squares, rectangles), objects, 3-D images, etc., that may typically be associated with a UI control on a user interface.

In some examples, a subset of the UI detection component, an example UI recognition component, may analyze the detected candidate regions. In other examples, an example UI recognition component separate from the UI detection component may analyze the detected candidate regions. Regardless of the structuring, the UI recognition component may analyze the detected candidate regions by applying an image recognition program that identifies one or more UI controls within the candidate regions and extracts the UI controls therefrom. More specifically, the UI recognition component may analyze a potential UI control (e.g., a rectangle) in the candidate region to determine what type of UI control it is. For example, the UI recognition component may analyze the potential UI control (e.g., the rectangle) in the top left corner of the digital image, and detect that the potential UI control is a button type of component.

In some examples, in determining that the detected UI control is a button type component, the UI recognition component may compare the identified UI control with UI definitions or controls stored at a database (e.g., an internal library) to determine that the UI control is a button type component as opposed to being a text window and/or other UI component. This determination may be made by identifying a UI definition stored at the database that matches the UI control identified on the user interface. Corresponding properties of the respective UI control may additionally be stored for some or all of the UI definitions at the database. Additionally or alternatively, the UI recognition component may extract other properties (e.g., static properties) of the UI control such as the vector height, font, color and/or background color.

The data identified and/or extracted from the digital image may then be input and/or fed into an example UI metadata generator. The UI metadata generator may process the identified UI controls and properties and/or UI definitions associated therewith and then generate corresponding technology neutral metadata. The metadata may be generated based on data stored at any accessible location. The data used to generate the metadata may be in an XML file or any other format.

In some examples, a graphic designer may scan a paper wireframe image of a user interface containing UI controls. The scanned image may be input into the UI control detection component where a candidate region of the image is detected containing a rectangle that may possibly be a UI control. An example UI recognition component may then analyze the candidate region to determine that the rectangle is in fact a UI control relating to a text box. The UI recognition component may also extract any extractable data related to the text box such as the location, the size, etc. Neutral metadata may then be generated by inputting the identified and extracted data related to the text box UI control into an example UI metadata generator component. This neutral metadata may be stored at any suitable location and may later be used to generate user interface screens in any technology.

FIG. 1 depicts an example metadata generation system 100 including a data store or source 102 and a system 104. One or both of the data source 102 and/or the system 104 may interact with an access device 106. In some examples, the data source 102 and/or the system 104 can be implemented in a single system. In some examples, the data source 102 and/or the system 104 can be wholly or partially implemented in the access device 106. In some examples, the data source 102 and/or the system 104 can communicate with the access device 106 via a network 108. In some examples, the access device 106 can communicate with the data source 102 and/or the system 104 via the network 108. The network 108 may be implemented by, for example, the Internet, an intranet, a private or personal network, a wired or wireless Local Area Network, a wired or wireless Wide Area Network, a cellular network and/or any other suitable network.

The access devices 106 may receive an image of a user interface and/or other data and convey the same to the metadata generation system 100 to facilitate identifying user interface controls within the image and generating corresponding metadata. The image may be a screenshot (e.g., a soft copy) containing UI controls and/or the image may be a digital image converted from a hard copy of a screen shot containing UI controls drawn by a graphic designer, for example. In some examples, the data source 102 can receive UI images and/or data related thereto from the access device 106. In some examples, the system 104 can receive UI images and/or data related thereto from the access device 106. The data source 102 and/or the system 104 can be implemented in any integrated development environment or may be a separate product.

The access device 106 can be implemented using a workstation (e.g., a laptop, a desktop, a tablet computer, etc.). In some examples, the access device 106 may include and/or have a scanner associated therewith.

In some examples, a graphic designer may want to develop a user interface. The process of developing a user interface can include the extremely time consuming process of selecting different UI controls and dragging and dropping them on different portions of the UI screen to generate the corresponding metadata relating to these controls. The amount of time to develop a user interface is increased when the user interface is complex and/or includes numerous UI controls.

In such instances, using the examples described herein, the access device 106 and the data source 102 and/or the system 104 may interact to efficiently generate metadata and, in some instances, technology neutral metadata based on receiving a digital image as an input. The digital image may contain images of UI components contained therein. For example, if a graphic designer wants to develop a user interface based on a digital image, a copy of the image may be transferred from the access device 106 to the data source 102 and/or the system 104. Once received, the data source 102 and/or the system 104 may perform processes to identify UI controls contained in the image and, thereafter, generate corresponding technology neutral metadata. The generated metadata may be accessible to and/or stored at the data source 102 and/or the system 104.

In some examples, the processes include scanning for and/or detecting one or more candidate regions on the image that may possibly contain a UI control. The data source 102 and/or the system 104 may detect the one or more candidate regions based on some criteria. For example, the criteria may be associated with scanning, detecting and/or identifying regions of the image that include shapes and/or objects that may commonly be associated with a UI control. For example, a rectangle may be commonly associated with a button or a text box.

If one or more candidate regions are identified, the data source 102 and/or the system 104 may analyze the candidate regions to confirm the presence of a UI control and identity the same. In some examples, the presence and identity of the UI control is confirmed and/or determined by comparing the potential UI control contained within the identified candidate region with UI definitions stored at and/or accessible by the data source 102 and/or the system 104. When a match is identified between the potential UI control and the UI definition, the data source 102 and/or the system 104 may associate the identified UI control on the image with the corresponding UI definition. Additionally or alternatively, the data source and/or the system 104 may extract other properties associated with the UI control from the digital image. Some of these properties may include static properties such as location, size, font, color, background color, etc.

The data source 102 and/or the system 104 may then generate technology neutral metadata based on, for example, the identified UI controls, extracted properties and/or the UI definitions associated therewith. The metadata may be generated based on data stored at and/or accessible to the data source 102 and/or the system 104. The metadata, once generated, may be stored at any suitable location and may be used to develop user interfaces in any technology such as .NET©, JAVA©, etc. In some examples, the metadata, once generated, may be transferred from the data source 102 and/or the system 104 to the access device 106 where it may be viewable by a person (e.g., graphic designer) at a user interface of the access device 106, for example.

Figure 2:
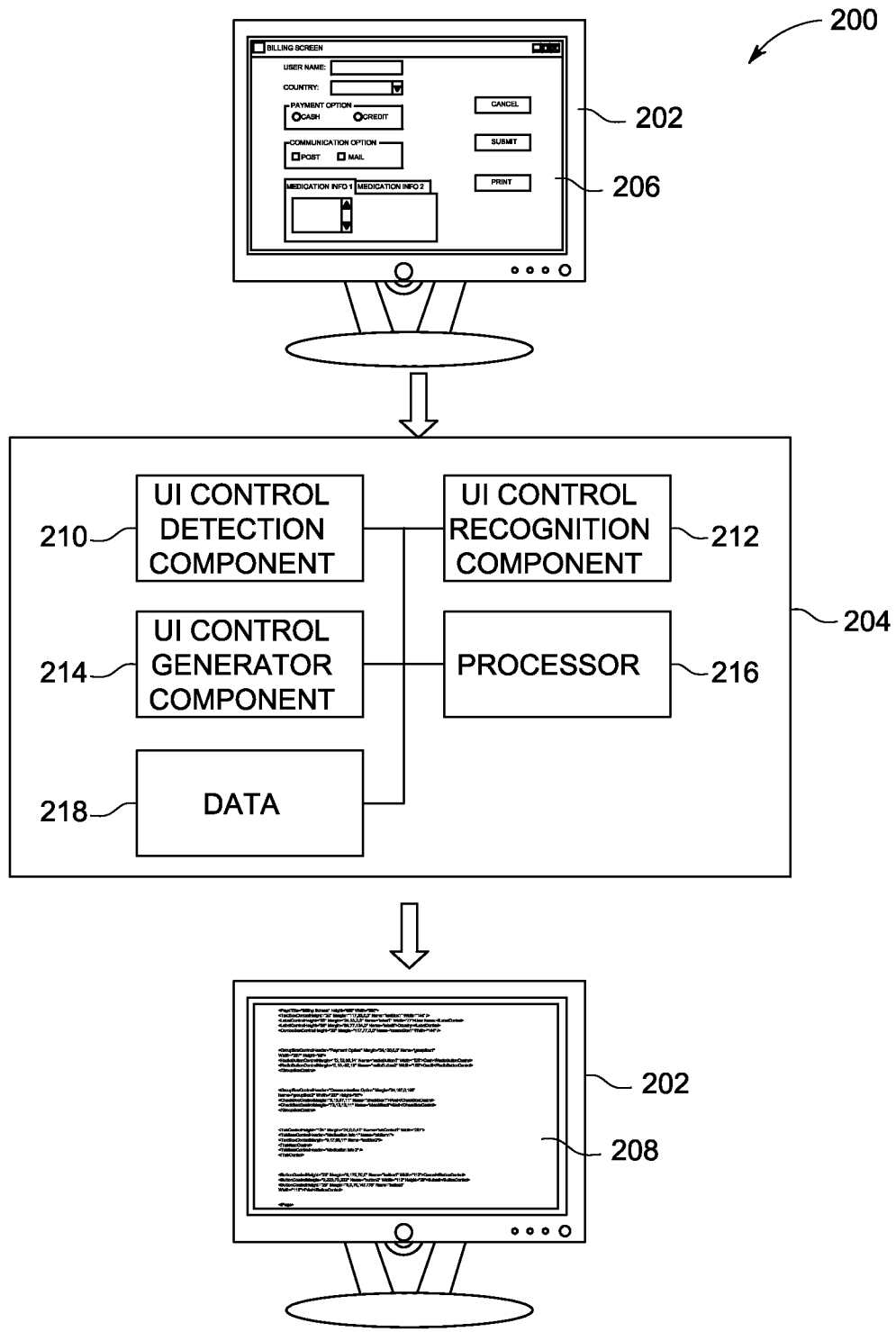
FIG. 2 is an example workflow involving systems and methods described herein.

FIG. 2 is a block diagram of an example workflow 200 including an access device 202 and a metadata generation system 204. In some examples, the metadata generation system 204 may be partially or wholly implemented in the access device 202. The metadata generation system 204 may be used to implement the data source 102 and/or the system 104 of FIG. 1. The access device 202 may be used to implement the access device 106 of FIG. 1.

At reference number 206, the access device 202 depicts a digital image 206 of a user interface. The digital image 206 may have been generated using the access device 202 or may have been scanned into the access device 202 from a hard copy, for example. At reference number 208, the access device 202 depicts technology neutral metadata 208 generated based on the digital image 206 using the examples described herein. The metadata generation system 204 may include a UI control detection component 210, a UI control recognition component or analyzer 212, a UI control generator component 214, a processor 216 and a data source 218. While an example of implementing the data source 102 and/or the system 104 and the access device 106 of FIG. 1 have been illustrated in FIG. 2, one or more of the elements, processes and/or devices illustrated in FIG. 2 may be combined, divided, re-arranged, omitted, eliminated and/or implemented in other ways. In some examples, the processor 216 may be integrated into the UI control detection component 210, the UI control recognition component 212, the UI control generator component 214 and/or the data source 218.

The access device 202, the UI control detection component 210, the UI control recognition component 212, the UI control generator component 214, the processor 216 and/or the data source 218 and, more generally, the example workflow 200 and/or the metadata generation system 204 may be implemented by hardware, software, firmware and/or a combination of hardware, software and/or firmware. Thus, the access device 202, the UI control detection component 210, the UI control recognition component 212, the UI control generator component 214, the processor 216 and/or the data source 218 and, more generally, the example workflow 200 and/or the metadata generation system 204 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the access device 202, the UI control detection component 210, the UI control recognition component 212, the UI control generator component 214, the processor 216 and/or the data source 218 and, more generally, the example workflow 200 are hereby expressly defined to include a tangible medium such as a memory, DVD, CD, Blu-ray, etc., storing the software and/or firmware. Further still, the example workflow 200 and/or the metadata generation system 204 of FIG. 2 may include one or more elements, processes and/or devices in addition to, or instead of, those illustrated in FIG. 2, and/or may include more than one of any or all of the illustrated elements, processes and devices.

Once the digital image 206 has been inputted onto the access device 202, the digital image or a copy thereof may be conveyed to the metadata generation system 204 and stored at the data source 218. In some examples, the UI control detection component 210 may receive the digital image from the data source 218 and scan the image to detect one or more candidate regions that may potentially contain user interface controls and/or images of user interface controls. The UI control detection component 210 may detect candidate regions on the image based on logic and/or internal metadata. The logic and/or internal metadata may include sample UI control image features and/or sample non-UI control image features that enable and/or train the UI control detection component 210 to distinguish between a UI control and a non-UI control.

In some examples, the UI control detection component 210 may detect a first candidate region at the bottom left corner of the image including a rectangle that may possibly be a UI control and a second candidate region at the center of the image including a 3-D object that may possibly include a UI control. In other examples, the UI control detection component 210 may detect a first candidate region at the bottom left corner of the image including both a rectangle that may possibly be a UI control and a 3-D object that may be possibly be a UI control.

In some examples, the UI control detection component 210 scans the image by sections and/or regions and makes a determination if each of the regions contains a possible UI control. The regions of the image scanned by the UI control detection component 210 may be similarly or differently sized. The regions of the image scanned by the UI control detection component 210 may be any suitable shape such as rectangles, squares, etc. Information relating to the candidate regions or any other information identified by the UI control detection component 210 may be stored at the data source 218 and/or any other data base accessible to the metadata generation system 204.

The detected candidate regions may be analyzed by the UI control recognition component 212. In some examples, the UI control recognition component 212 may analyze the candidate regions to identify a UI control contained therein using an image recognition program. In some examples, the UI control recognition component 212 may analyze the candidate regions by comparing a potential UI control to UI definitions stored at the data source 218 to identify the UI definition associated with the identified potential UI control. If a match is identified, the UI control recognition component 212 may associate the UI control in the candidate region of the image with the corresponding UI definition.

The UI control recognition component 212 may additionally extract static properties from the image and/or associated with the identified UI control. Some of the static properties may include location, font, background color, size, etc. The identity of the UI control(s), the extracted properties, UI definition(s) along with any other information identified and/or extracted by the UI control recognition component 212 may be stored at the data source 218 and/or any other data base accessible to the metadata generation system 204.

The UI control generator component 214 may receive the information relating to the identified UI controls from the data source 218 and then generate corresponding technology neutral metadata. The metadata may be generated based on data stored at the data source 218 and/or any other data base accessible to the UI control generator component 214. The generated metadata may be stored at the data source 218 and/or any other suitable data base and may be used to develop user interfaces in any technology.

In some examples, after and/or while the UI control generator component 214 is generating the metadata, some or all of this metadata may be displayed on the access device 202 at reference number 208. A graphic designer may then view, edit and/or add to the metadata 208 if desired.

The metadata generation system 204 includes the processor 216 retrieving data, executing functionality and storing data at the data source 218, the access device 202, the access device 106, the data source 102 of FIG. 1 and/or the system 104 of FIG. 1. In some examples, the processor 216 drives respective components of the metadata generation system 204. For example, the processor 216 may drive the UI control detection component 210 to scan an image to identify one or more candidate regions. The processor 216 may drive the UI control recognition component 212 to analyze the candidate regions and determine an identity and/or properties of any UI controls contained within the respective candidate region. The processor 216 may drive the UI control generator component 214 to generate technology neutral metadata based on information identified and/or extracted by the UI control detection component 210 and/or the UI control recognition component 212. In some examples, the processor 216 may drive the access device 202 to provide information and functionality to a user input to control the access device 202, edit information, view the digital image 206 and/or the metadata 208, etc.

The access device 202 and the metadata generation system 204 may include one or more internal memories and/or data stores including the data source 218. Data storage can include any variety of internal and/or external memory, disk, remote storage communicating with the metadata generation system 204 and/or the access device 202.

Figure 3:
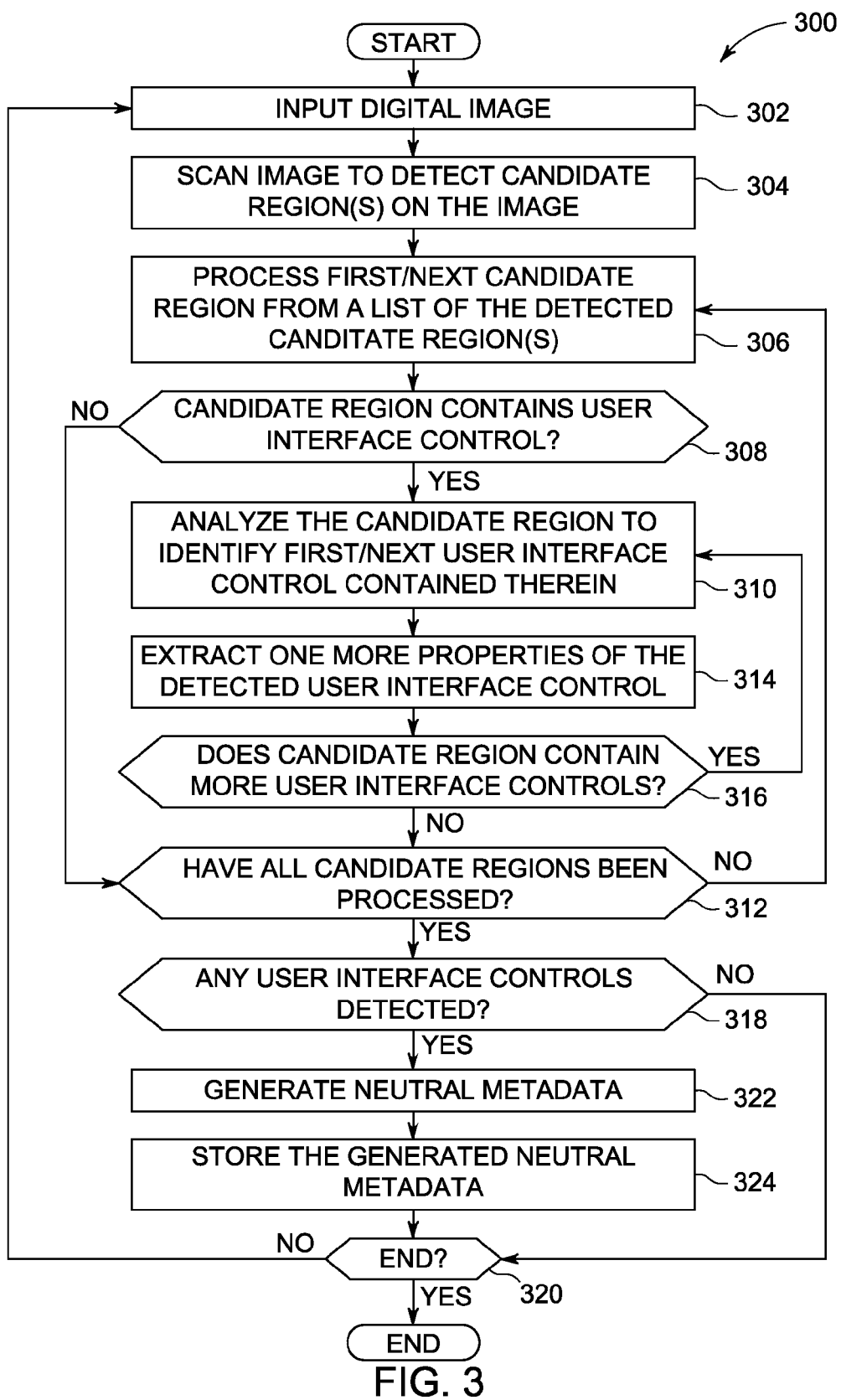
FIGS. 3-4 are flow diagrams of example methods that can be used to implement the examples described herein.
Figure 4:
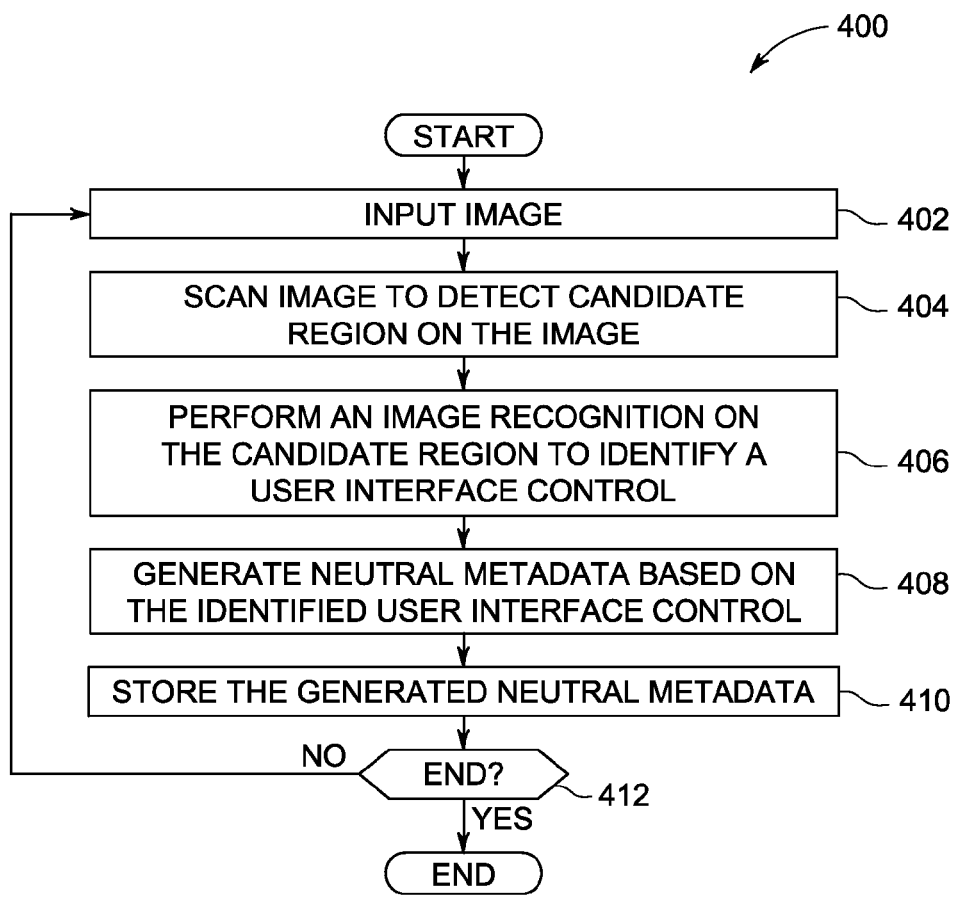

FIGS. 3-4 depict example flow diagrams representative of processes that may be implemented using, for example, computer readable instructions that may be used to automatically generate technology neutral metadata using one or more access devices, a metadata generation system, a data store and/or a system. The example processes of FIGS. 3-4 may be performed using a processor, a controller and/or any other suitable processing device. For example, the example processes of FIGS. 3-4 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 3-4 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 3-4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 3-4 may be implemented manually or as any combination(s) of any of the foregoing techniques, for example, any combination of firmware, software, discrete logic and/or hardware. Further, although the example processes of FIGS. 3-4 are described with reference to the flow diagrams of FIGS. 3-4, other methods of implementing the processes of FIGS. 3-4 may be employed. For example, the order of execution of the blocks may be changed, and/or some of the blocks described may be changed, eliminated, sub-divided, or combined. Additionally, any or all of the example processes of FIGS. 3-4 may be performed sequentially and/or in parallel by, for example, separate processing threads, processors, devices, discrete logic, circuits, etc.

FIG. 3 relates to an example method 300 that enables metadata to be automatically generated based on a digital image. At block 302, the method 300 inputs a digital image. The image may be a gif image, a tiff image, a jpeg image, a digital image, a screen shot of a user interface, etc. The image may be based on a digital image created using one of the access devices 106 and/or 202. The image may be a sketch of a user interface created by a graphic designer that has been scanned into the access device 106 and/or 202. Regardless of the method used in creating the image, the image may include one or more images, regions and/or components containing UI controls. These images, regions and/or components may be related to text boxes, buttons, etc.

At block 304, the method 300 scans the image to detect any candidate regions on the image. The candidate regions may be potentially associated with a UI control. At block 306, the method 300 processes the first or next candidate region from a list of the detected candidate region(s). At block 308, the method 300 analyzes the candidate region to determine if a UI control is contained therein. If the method 300 determines that the candidate region contains one or more UI controls, control advances to block 310. However, if the method 300 determines that the candidate region does not contain one or more UI controls, control advances to block 312.

At block 310, the method 300 analyzes the candidate regions to identify a UI control therein. In some examples, the method 300 analyzes the candidate regions by performing an image recognition on the candidate regions. In some examples, the method 300 may analyze the candidate regions by comparing a potential and/or identified UI control contained within a candidate region to UI definitions to identify one of the UI definitions associated with the identified UI control.

At block 314, the method 300 extracts one or more properties of the detected UI controls. The properties may be based on the static properties and/or data associated with the UI definition, for example. At block 316, the method 300 determines whether or not the detected candidate region contains more UI control(s). If the detected candidate region contains more UI controls, control returns to block 308. However, if candidate region does not contain more UI controls, control advances to block 312.

At block 312, the method 300 determines if all of the detected candidate regions have been processed. If not all of the candidate regions have been processed, control returns to block 306. However, if all of the candidate regions have been processed, control advances to block 318. At block 318, the method 300 determines whether or not any UI controls have been detected. If no UI controls have been detected, control advances to block 320.

However, if one or more UI controls have been detected, control advances to block 322. At block 322, the method 300 generates neutral metadata. In some examples, the method 300 may generate the neutral metadata based on the identity of the UI control contained within the candidate region. In some examples, the method 300 may generate the neutral metadata based on properties such as static properties extracted from the digital image. In some examples, the method 300 may generate the neutral metadata based on UI definitions associated with the respective UI control contained in the candidate region(s). At block 324, the method 300 stores the neutral metadata. In some example, the stored metadata may be used to develop user interfaces in any technology. At block 320, the method 300 determines whether or not to return to block 302. Otherwise the example method 300 is ended.

FIG. 4 relates to an example method 400 that enables metadata to be automatically generated based on a digital image. At block 402, the method 400 inputs an image. The image may be based on a digital image created using one of the access devices 106 and/or 202. The image may be a sketch of a user interface created by a graphic designer that has been scanned into the access device 106 and/or 202. Regardless of the method used in creating the image, the image may include one or more images and/or regions containing UI controls. These images and/or components may be related to text boxes, buttons, etc.

At block 404, the method 400 scans the image to detect any candidate regions on the image. The candidate regions may be potentially associated with a UI control. At block 406, the method 400 performs an image recognition on the candidate region(s) to identify a UI control. In some examples, when applying the image recognition to the candidate region(s), the method 400 identifies a potential UI control contained within one of the candidate regions and compares this potential UI control to UI definitions stored at a database to identify one of the UI definitions associated with the identified UI control. In some example, when applying the image recognition to the candidate region(s), the method 400 extracts one or more properties from the image and/or associated with the potential and/or identified UI control. At block 408, the method 400 generates neutral metadata. In some examples, the method 400 may generate the neutral metadata based on the identity of the UI control(s) contained within the candidate region(s). In some examples, the method 400 may generate the neutral metadata based on properties such as static properties extracted from the digital image. In some examples, the method 400 may generate the neutral metadata based on UI definitions associated with the respective UI control contained in the candidate region(s). At block 410, the method 400 stores the neutral metadata. In some example, the stored metadata may be used to develop user interfaces in any technology. At block 412, the method 400 determines whether or not to return to block 402. Otherwise the example method 400 is ended.

Figure 5:
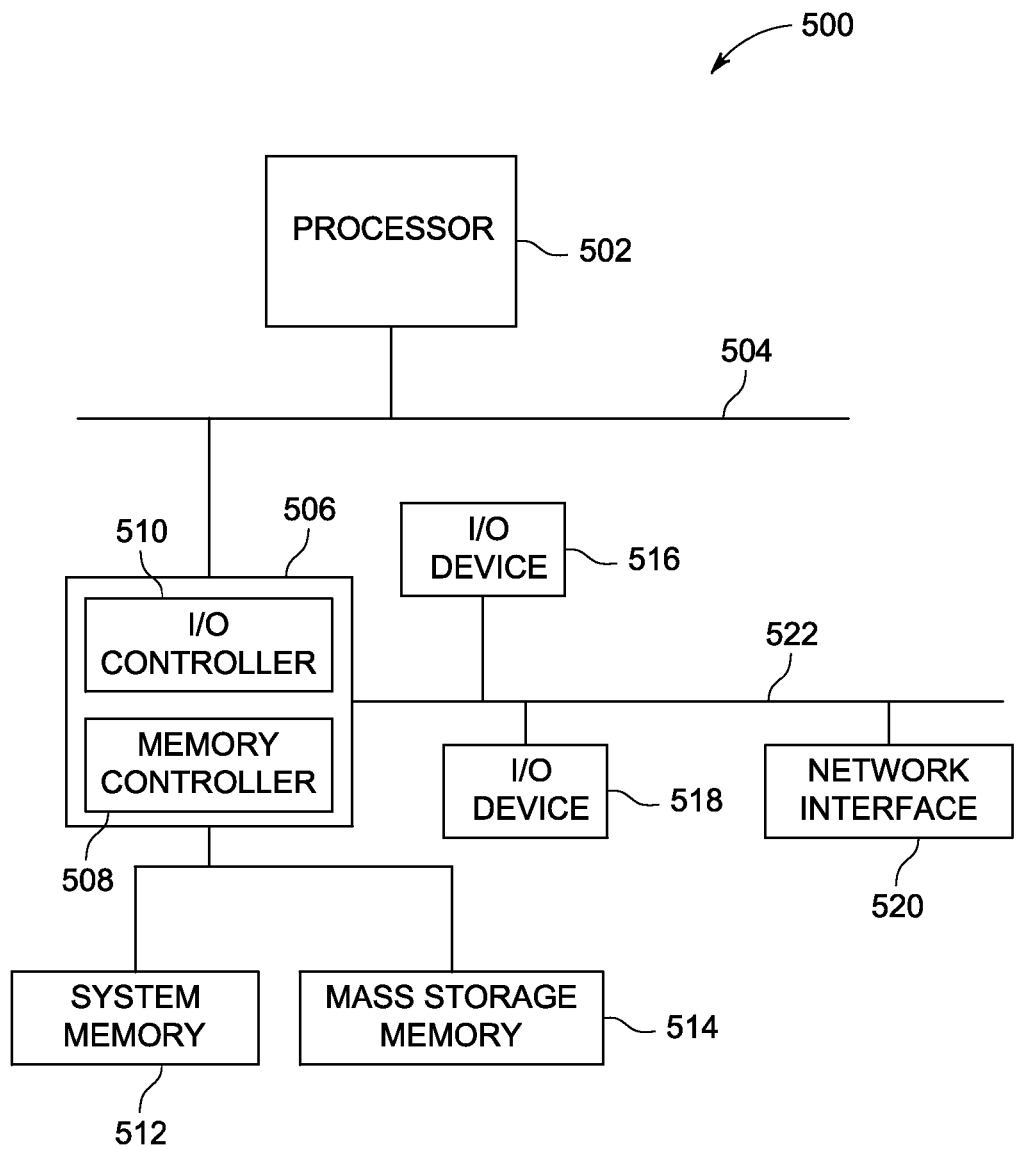
FIG. 5 is a schematic illustration of an example processor platform that may be used and/or programmed to implement any or all of the example methods and systems described herein.

FIG. 5 is a block diagram of an example processor system 500 that may be used to implement the systems and methods described herein. As shown in FIG. 5, the processor system 500 includes a processor 502 that is coupled to an interconnection bus 504. The processor 502 may be any suitable processor, processing unit or microprocessor. Although not shown in FIG. 5, the processor system 500 may be a multi-processor system and, thus, may include one or more additional processors that are identical or similar to the processor 502 and that are communicatively coupled to the interconnection bus 504.

The processor 502 of FIG. 5 is coupled to a chipset 506, which includes a memory controller 508 and an input/output (I/O) controller 510. As is well known, a chipset typically provides I/O and memory management functions as well as a plurality of general purpose and/or special purpose registers, timers, etc. that are accessible or used by one or more processors coupled to the chipset 506. The memory controller 508 performs functions that enable the processor 502 (or processors if there are multiple processors) to access a system memory 512 and a mass storage memory 514.

The system memory 512 may include any desired type of volatile and/or non-volatile memory such as, for example, static random access memory (SRAM), dynamic random access memory (DRAM), flash memory, read-only memory (ROM), etc. The mass storage memory 514 may include any desired type of mass storage device including hard disk drives, optical drives, tape storage devices, etc.

The I/O controller 510 performs functions that enable the processor 502 to communicate with peripheral input/output (I/O) devices 516 and 518 and a network interface 520 via an I/O bus 522. The I/O devices 516 and 518 may be any desired type of I/O device such as, for example, a keyboard, a video display or monitor, a mouse, etc. The network interface 520 may be, for example, an Ethernet device, an asynchronous transfer mode (ATM) device, an 802.11 device, a DSL modem, a cable modem, a cellular modem, etc. that enables the processor system 500 to communicate with another processor system.

While the memory controller 508 and the I/O controller 510 are depicted in FIG. 5 as separate blocks within the chipset 506, the functions performed by these blocks may be integrated within a single semiconductor circuit or may be implemented using two or more separate integrated circuits.

Figure 6:
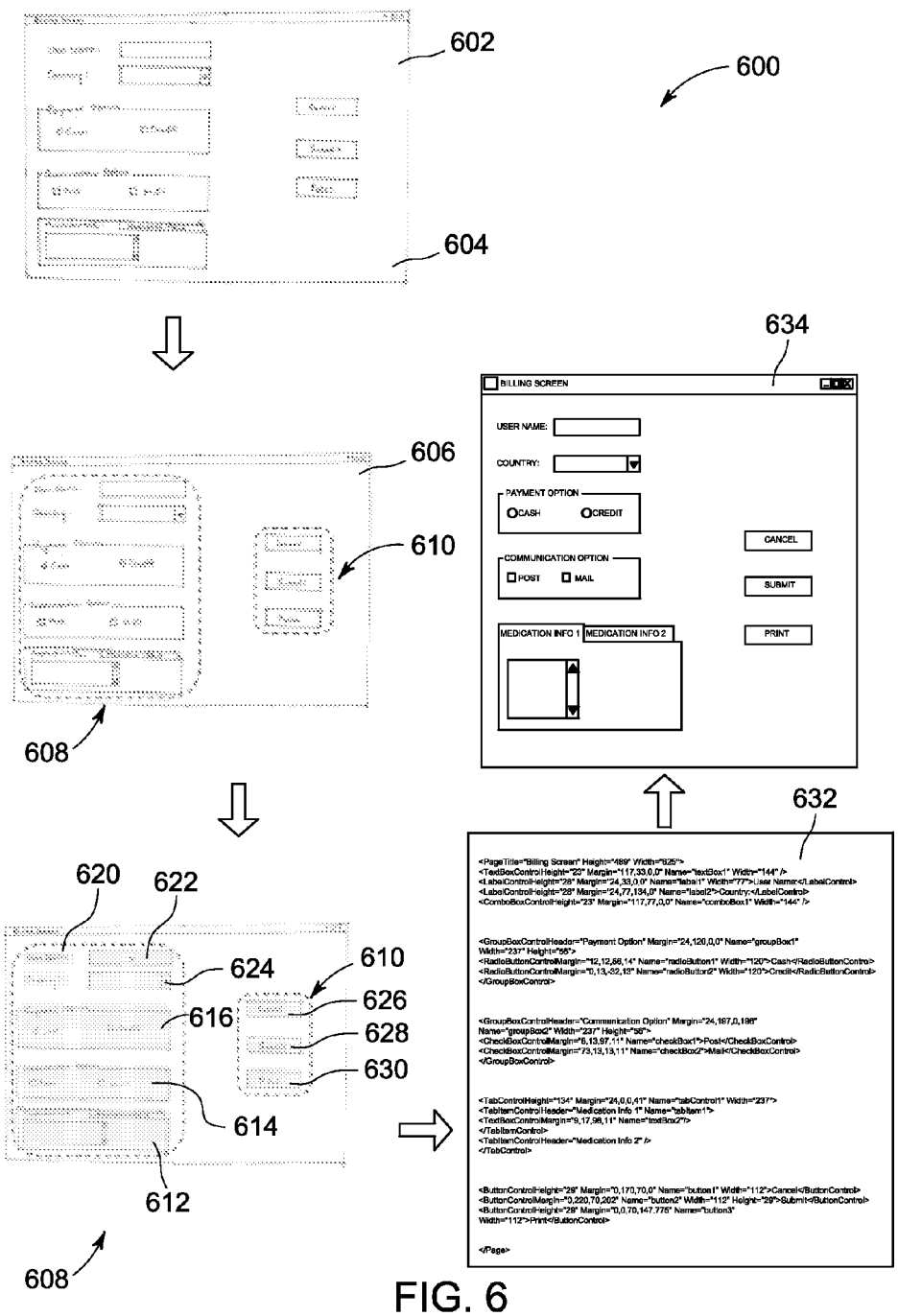
FIG. 6 depicts an example system and associated workflow for metadata generation.
Figure 3:
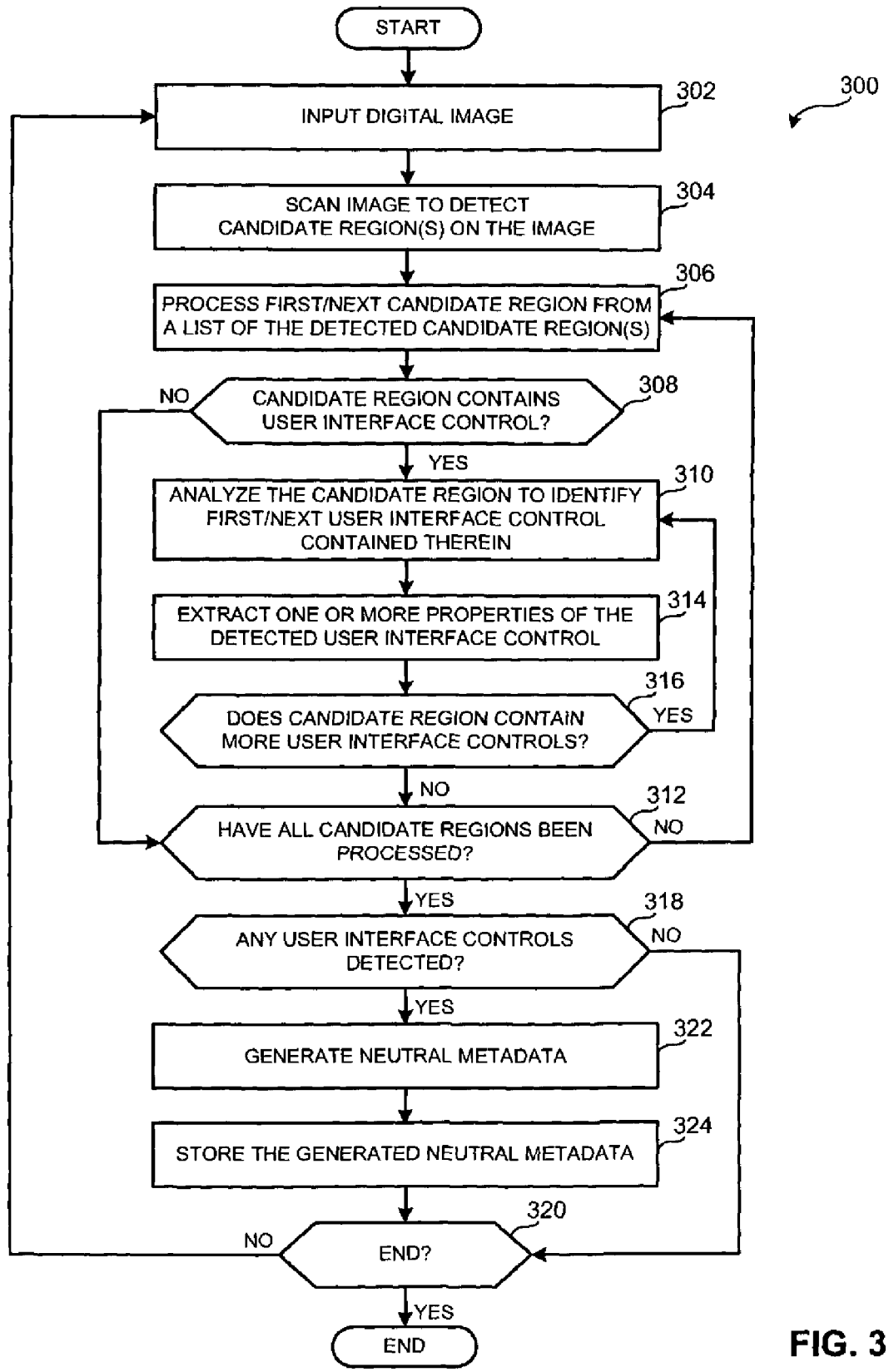

FIG. 6 depicts an example system and associated workflow 600 for metadata generation. At 602, a hand-drawn graphical UI image 604 may be scanned and converted into a digital image. The digital image may be a .gif image, a .tiff image, a .jpeg image, etc. At 606, an example UI control detection component may detect one or more candidate regions 608, 610 that contains and/or potentially contains one or more UI controls. At 612, an example UI control recognition component may analyze the candidate regions 608, 610 to identify UI controls 612-630 contained therein. In some examples, the UI control recognition component may apply an image recognition program to identify the UI controls 612-630 within the candidate regions 608, 610 and/or to extract the UI controls and/or related data. In some examples, recognized UI controls may be differentiated by color (e.g., yellow) on the UI, by outlining, etc.

At 632, metadata is generated for one or more UI control components by an example UI metadata generator component. The UI metadata generator component may process the identified UI controls and/or extracted data and generate corresponding technology neutral metadata based on the same. In some example, technology neutral metadata may be used to generate an actual UI control component(s) for interaction by a user. In some examples, the technology neutral metadata may be used to generate graphical user interfaces in any desired technology by writing the specified source code generator. At 634, a UI screen is depicted that may be generated based on the metadata using any programming language and/or integrated development environment (IDE).

The example systems and methods output technology neutral metadata based on the input of a digital image. More specifically, upon receipt of a digital image, the example systems and methods identify candidate regions potentially containing a UI control and then further analyze these candidate regions to determine the identity of the potential UI controls (e.g. type, UI control, non-UI control, etc.). Additionally or alternatively, the example systems and methods further analyze these candidate regions to extract corresponding properties (e.g., static properties). Based on the identified, extracted properties, etc., the example systems and methods may automatically generate technology neutral metadata that may be advantageously used to create user interfaces in any suitable technology.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

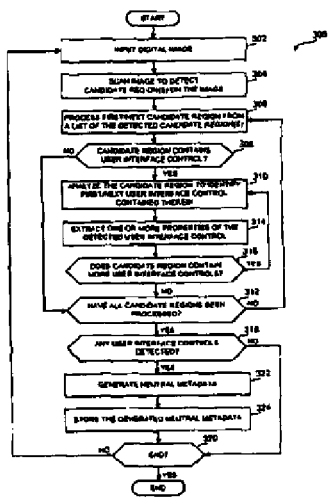

What is claimed is:

1. A computer-implemented method of automatically generating metadata used to develop graphical user interfaces, comprising:
    scanning a hand-drawn image of a user interface to detect a candidate region on the image, the candidate region being potentially associated with a user interface component;
    analyzing the candidate region to identify a user interface component contained therein by comparing a potential user interface component to user interface definitions stored in a database to identify one of the user interface definitions associated therewith;
    extracting one or more properties of the identified user interface component;
    generating metadata based on the user interface definition associated with the identified user interface component and the extracted properties; and
    computer generating a second user interface based on the metadata and the scanned image.

2. The method of claim 1, wherein at least analyzing the candidate region to identify the user interface component contained therein further comprises performing an image recognition on the candidate region.

3. The method of claim 1, wherein one or more of the extracted properties comprise static properties.

4. The method of claim 3, wherein the static properties comprise at least one of a location of the identified user interface component, a font associated with the identified user interface component, a background color associated with the identified user interface component, or a size associated with the identified user interface component.

5. The method of claim 1, further comprising storing the generated metadata in a database.

6. The method of claim 1, wherein the image comprises one of a digital image, a gif image, a tiff image, or a jpeg image.

7. The method of claim 1, wherein the image comprises a digital image.

8. The method of claim 1, wherein the image comprises a screenshot of a user interface.

9. A computer-implemented method of automatically generating metadata used to develop graphical user interfaces, comprising:

scanning a drawn image of a user interface to detect a candidate region on the image, the candidate region being potentially associated with a user interface control;

performing an image recognition on the candidate region to identify a user interface control;

generating metadata based on the identified user interface control; and computer-generating a second user interface based on the metadata and the scanned image.

10. The method of claim 9, wherein performing the image recognition is to further extract properties associated with the identified user interface control.

11. The method of claim 10, wherein one or more of the extracted properties comprise static properties.

12. The method of claim 11, wherein the static properties include at least one of a location of the identified user interface control, a font associated with the identified user interface control, a background color associated with the identified user interface control, or a size associated with the identified user interface control.

13. The method of claim 11, wherein performing an image recognition comprises identifying a potential user interface control and comparing the potential user interface control to user interface definitions stored in a database to identify one of the user interface definitions associated therewith.

14. The method of claim 13, wherein generating metadata based on the identified user interface control comprises generating the metadata based on the one of the user interface definitions associated with the identified user interface control.

15. A tangible computer-readable storage medium including executable instructions for execution using a processor, wherein the instructions, when executed, provide a system to generate metadata, the system comprising:

a detector to detect a candidate region on a drawn image of a user interface, the candidate region being potentially associated with a user interface control;

an analyzer to analyze the candidate region to identify a user interface control contained therein; and a generator to generate metadata based on the identified user interface control, the generator to computer generate a second user interface based on the metadata and the image.

16. The tangible computer-readable storage medium of claim 15, wherein the analyzer is to compare a potential user interface control to user interface definitions stored in a database to identify one of the user interface definitions associated therewith.

17. The tangible computer-readable storage medium of claim 15, wherein the generator is to generate metadata further based on the user interface definition associated with the identified user interface control.

18. The tangible computer-readable storage medium of claim 15, wherein the analyzer is to further extract one or more properties of the detected user interface control.

19. The tangible computer-readable storage medium of claim 18, wherein the generator is to generate metadata further based on the extracted one or more properties.

20. The tangible computer-readable storage medium of claim 18, wherein the properties comprise static properties including at least one of a location of the identified user interface control, a font associated with the identified user interface control, a background color associated with the identified user interface control, or a size associated with the identified user interface control.

* * * * *

UNITED STATES PATENT AND TRADEMARK OFFICE
CERTIFICATE OF CORRECTION

| | | |
|---|---|---|
| PATENT NO. | : 8,977,971 B2 | Page 1 of 3 |
| APPLICATION NO. | : 13/043007 | |
| DATED | : March 10, 2015 | |
| INVENTOR(S) | : Singh et al. | |

It is certified that error appears in the above-identified patent and that said Letters Patent is hereby corrected as shown below:

The title page showing the illustrative figure should be deleted to be replaced with the attached title page.

In the Drawings

In the drawing sheet, consisting of Fig. 3, should be deleted to be replaced with the drawing sheet, consisting of Fig. 3, as shown on the attached pages.

Signed and Sealed this
Seventh Day of July, 2015

Michelle K. Lee
*Director of the United States Patent and Trademark Office*

United States Patent
Singh et al.

(10) Patent No.: US 8,977,971 B2
(45) Date of Patent: Mar. 10, 2015

(54) METADATA GENERATION SYSTEMS AND METHODS

(75) Inventors: Gurpreet Singh, New Delhi (IN); Nagesh Phaniraj, Bangalore (IN)

(73) Assignee: General Electric Company, Schenectady, NY (US)

(*) Notice: Subject to any disclaimer, the term of this patent is extended or adjusted under 35 U.S.C. 154(b) by 548 days.

(21) Appl. No.: 13/043,007

(22) Filed: Mar. 8, 2011

(65) Prior Publication Data
US 2012/0166978 A1 Jun. 28, 2012

(30) Foreign Application Priority Data
Dec. 24, 2010 (IN) .......................... 3948/CHE/2010

(51) Int. Cl.
- G06F 3/00 (2006.01)
- G06F 9/44 (2006.01)
- G06F 9/45 (2006.01)

(52) U.S. Cl.
CPC .............. G06F 8/38 (2013.01); G06F 9/4443 (2013.01); G06F 8/51 (2013.01)
USPC ........................ 715/762; 715/763; 715/764

(58) Field of Classification Search
CPC ........................... G06F 9/4443; G06F 8/38
USPC ..................... 715/221–226, 780, 762-764
See application file for complete search history.

(56) References Cited

U.S. PATENT DOCUMENTS

| | | | |
|---|---|---|---|
| 7,487,438 B1* | 2/2009 | Withers | 715/223 |
| 7,624,027 B1* | 11/2009 | Stern et al. | 705/2 |
| 8,140,590 B2* | 3/2012 | Genovese et al. | 707/804 |
| 2002/0165877 A1* | 11/2002 | Malcolm et al. | 707/507 |
| 2004/0001631 A1* | 1/2004 | Camara et al. | 382/224 |
| 2006/0004836 A1* | 1/2006 | Dhingra | 707/102 |
| 2006/0077461 A1* | 4/2006 | Camara et al. | 358/1.15 |
| 2006/0095830 A1* | 5/2006 | Krishna et al. | 715/500 |
| 2006/0143154 A1* | 6/2006 | Jager | 707/1 |
| 2006/0198559 A1* | 9/2006 | Manico et al. | 382/305 |
| 2007/0112764 A1* | 5/2007 | Yih et al. | 707/5 |
| 2008/0247004 A1* | 10/2008 | Yeung | 358/486 |
| 2009/0024637 A1* | 1/2009 | Krishna et al. | 707/10 |
| 2009/0119324 A1* | 5/2009 | Simard et al. | 707/102 |
| 2009/0125797 A1* | 5/2009 | Minagawa et al. | 715/221 |
| 2010/0128922 A1* | 5/2010 | Navon et al. | 382/100 |
| 2010/0161460 A1* | 6/2010 | Vroom et al. | 705/31 |

(Continued)

FOREIGN PATENT DOCUMENTS

WO 2008003095 A3 1/2008

*Primary Examiner* — Tadeese Hailu
(74) *Attorney, Agent, or Firm* — Hanley, Flight & Zimmerman, LLC

(57) ABSTRACT

Metadata generation systems and methods are described. An example computer-implemented method of automatically generating metadata used to develop graphical user interfaces includes scanning an image of a user interface to detect a candidate region on the image, the candidate region being potentially associated with a user interface component. The example method includes analyzing the candidate region to identify a user interface component contained therein by comparing a potential user interface component to user interface definitions stored in a database to identify one of the user interface definitions associated therewith. The example method includes extracting one or more properties of the identified user interface component and generating metadata based on the user interface definition associated with the identified user interface component and the extracted properties.

20 Claims, 6 Drawing Sheets